US 12,143,812 B2

(12) United States Patent
Kunz et al.

(10) Patent No.: US 12,143,812 B2
(45) Date of Patent: Nov. 12, 2024

(54) ENABLING ROAMING WITH AUTHENTICATION AND KEY MANAGEMENT FOR APPLICATIONS

(71) Applicant: Lenovo (Singapore) Pte. Ltd., New Tech Park (SG)

(72) Inventors: Andreas Kunz, Ladenburg (DE); Sheeba Backia Mary Baskaran, Friedrichsdorf (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 36 days.

(21) Appl. No.: 17/515,238

(22) Filed: Oct. 29, 2021

(65) Prior Publication Data
US 2023/0136693 A1    May 4, 2023

(51) Int. Cl.
*H04W 12/0431* (2021.01)
*H04W 12/033* (2021.01)
*H04W 12/041* (2021.01)
*H04W 12/08* (2021.01)

(52) U.S. Cl.
CPC ..... *H04W 12/0431* (2021.01); *H04W 12/033* (2021.01); *H04W 12/041* (2021.01); *H04W 12/08* (2013.01)

(58) Field of Classification Search
CPC ........... H04W 12/0431; H04W 12/033; H04W 12/041; H04W 12/08
See application file for complete search history.

(56) References Cited

U.S. PATENT DOCUMENTS

| 11,039,312 | B2 * | 6/2021 | Lehtovirta | H04W 12/106 |
| 11,483,741 | B2 * | 10/2022 | Nair | H04L 63/0281 |
| 2022/0191008 | A1 * | 6/2022 | Nair | H04W 12/043 |
| 2022/0210636 | A1 * | 6/2022 | Gupta | H04W 60/04 |
| 2022/0368684 | A1 * | 11/2022 | You | H04W 12/069 |

FOREIGN PATENT DOCUMENTS

IN        202041056987        * 12/2020

OTHER PUBLICATIONS

3GPP TS 33.535 V17.3.0 (Sep. 2021); Authentication and Key Management for Applications (AKMA) based on 3GPP credentials in the 5G System (SGS) (Year: 2021).*

(Continued)

*Primary Examiner* — Carl G Colin
*Assistant Examiner* — Andrew Suh
(74) *Attorney, Agent, or Firm* — Kunzler Bean & Adamson

(57) ABSTRACT

Apparatuses, methods, and systems are disclosed for enabling roaming with authentication and key management for applications. An apparatus includes a processor that determines a serving network of a user equipment ("UE") device, the serving network comprising a visited public land mobile network ("VPLMN") that is different from a home PLMN ("HPLMN") associated with the UE. The processor selects a network function within the serving network for provisioning an authentication and key management for applications ("AKMA") security context for an application function ("AF") based on a name for the serving network. The apparatus includes a transceiver that sends the security context to the network function.

17 Claims, 10 Drawing Sheets

(56) References Cited

OTHER PUBLICATIONS

Run Zhang, WenAn Zhou, and Huamiao Hu; Towards 5G Security Analysis against Null Security Algorithms Used in Normal Communication; Published Oct. 20, 2021; https://www.hindawi.com/journals/scn/2021/4498324/ (Year: 2021).*

3GPP, "3rd Generation Partnership Project; Technical Specification Group Services and System Aspects; Authentication and Key Management for Applications (AKMA) based on 3GPP credentials in the 5G System (5GS) (Release 17)", 3GPP TS 33.535 V17.3.0, Sep. 2021, pp. 1-24.

3GPP, "3rd Generation Partnership Project; Technical Specification Group Services and System Aspects; 5G System Enhancements for Edge Computing; Stage 2 (Release 17)", 3GPP TS 23.548 V17.0.0, Sep. 2021, 1-52.

3GPP, "3rd Generation Partnership Project; Technical Specification Group Services and System Aspects; Generic Authentication Architecture (GAA); Generic Bootstrapping Architecture (GBA) (Release 17)", 3GPP TS 33.220 V17.1.0, Jun. 2021, pp. 1-95.

SA3-LI, "Regulatory LI compliance of AKMA", 3GPP SA3LI#78e-d S3i200477, Aug. 25-26, 2020, pp. 1-2.

PCT/IB2022/060496, "Notification of Transmittal of the International Search Report and the Written Opinion of the International Searching Authority, or the Declaration", International Searching Authority, Jan. 23, 2023, pp. 1-14.

Ndre et al., "VPLMN LI for Roaming Scenarios with Encryption: Introduction", 3GPP SA3#81-LI-e-a S3i210257, Apr. 12-16, 2021, pp. 1-4.

Ndre et al., "VPLMN LI for Roaming Scenarios with Encryption: Problem Statement", 3GPP SA3#81-LI-e-1S3i210258, Apr. 12-16, 2021, pp. 1-10.

Ndre et al., "VPLMN LI for Roaming Scenarios with Encryption: Key Retrieval", 3GPP SA3#81-LI-e-a S3i210259, Apr. 12-16, 2021, pp. 1-6.

3GPP, "3rd Generation Partnership Project; Technical Specification Group Services and System Aspects; Security; Lawful Interception (LI) architecture and functions (Release 17)", 3GPP TS 33.127 V17.2.0, Dec. 2021, pp. 1-155.

3Gpp, "3rd Generation Partnership Project; Technical Specification Group Services and System Aspects; Authentication and Key Management for Applications (AKMA) based on 3GPP credentials in the 5G System (5GS) (Release 17)", 3GPP TS 33.535 V17.3.0, Dec. 2021, pp. 1-24.

* cited by examiner

ENABLING ROAMING WITH AUTHENTICATION AND KEY MANAGEMENT FOR APPLICATIONS

FIELD

The subject matter disclosed herein relates generally to wireless communications and more particularly relates to enabling roaming with authentication and key management for applications.

BACKGROUND

In wireless networks, data traffic between a UE and an Application Function ("AF"), which are not located in the same network, is security protected using the authentication and key management for applications ("AKMA") feature. Consequently, Legal Interception cannot be performed.

BRIEF SUMMARY

Disclosed are procedures for enabling roaming with authentication and key management for applications. Said procedures may be implemented by apparatus, systems, methods, and/or computer program products.

In one embodiment, a first apparatus includes a processor that determines a serving network of a user equipment ("UE") device, the serving network comprising a visited public land mobile network ("VPLMN") that is different from a home PLMN ("HPLMN") associated with the UE. In one embodiment, the processor selects a network function within the serving network for provisioning an authentication and key management for applications ("AKMA") security context for an application function ("AF") based on a name for the serving network. In one embodiment, the first apparatus includes a transceiver that sends the security context to the network function.

In one embodiment, a first method includes determining a serving network of a user equipment ("UE") device, the serving network comprising a visited public land mobile network ("VPLMN") that is different from a home PLMN ("HPLMN") associated with the UE. In one embodiment, the first method includes selecting a network function within the serving network for provisioning an authentication and key management for applications ("AKMA") security context for an application function ("AF") based on a name for the serving network. In one embodiment, the first method includes sending the security context to the network function.

In one embodiment, a second apparatus includes a transceiver that receives a key request at a network function of a serving network of a user equipment ("UE") device, the serving network comprising a visited public land mobile network ("VPLMN") that is different from a home PLMN ("HPLMN") associated with the UE, the key registration request for provisioning an authentication and key management for applications ("AKMA") security context for an application function ("AF") based on a name for the serving network for establishing a connection between the UE and the AF. In one embodiment, the transceiver sends a key response to a network function of the HPLMN.

In one embodiment, a second method includes receiving a key request at a network function of a serving network of a user equipment ("UE") device, the serving network comprising a visited public land mobile network ("VPLMN") that is different from a home PLMN ("HPLMN") associated with the UE, the key registration request for provisioning an authentication and key management for applications ("AKMA") security context for an application function ("AF") based on a name for the serving network for establishing a connection between the UE and the AF. In one embodiment, the second method includes sending a key response to a network function of the HPLMN.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
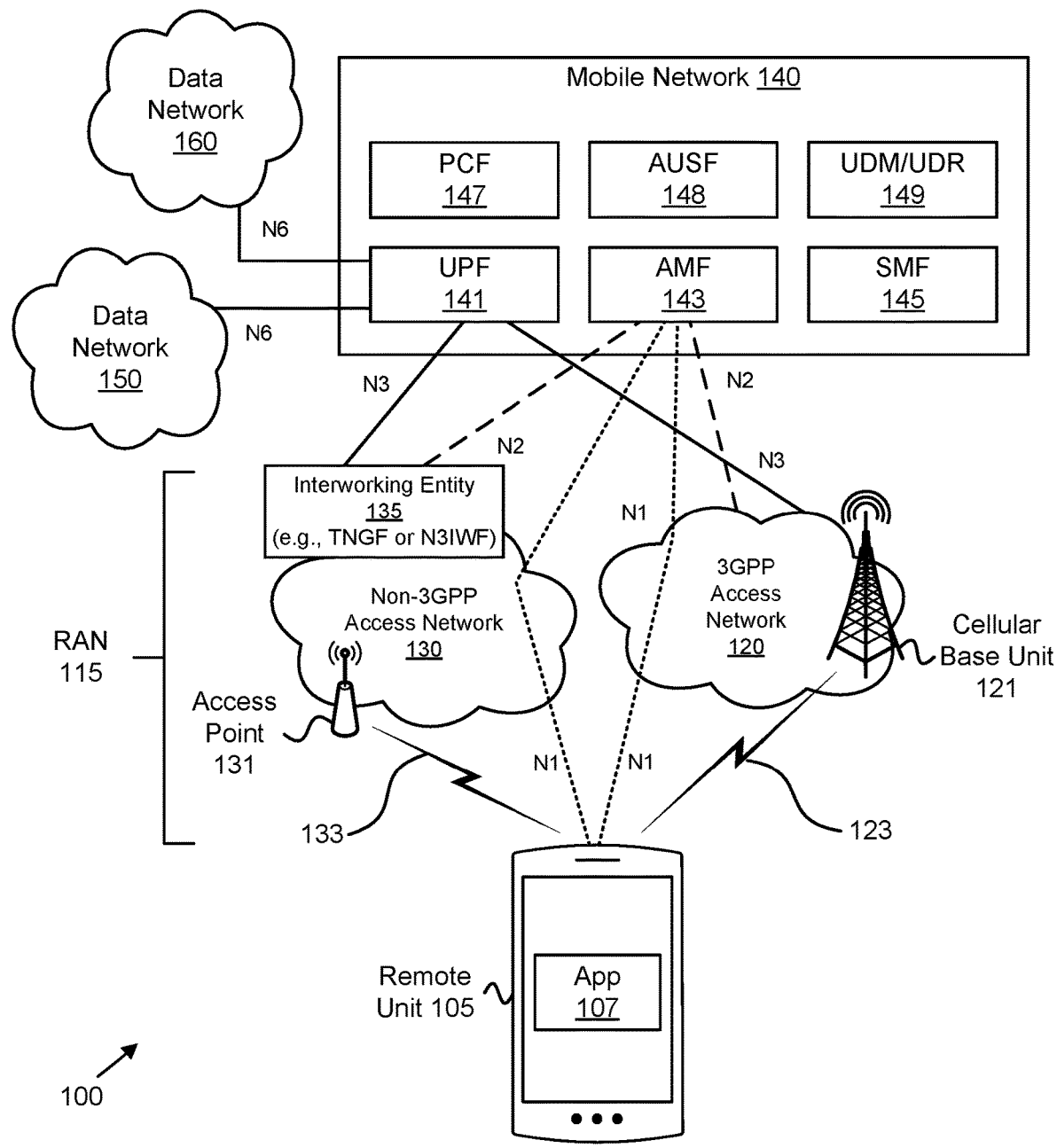
FIG. 1 is a schematic block diagram illustrating one embodiment of a wireless communication system for enabling roaming with authentication and key management for applications.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for enabling roaming with authentication and key management for applications. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Current specification 3GPP TS 33.535 on Authentication and Key Management for Applications ("AKMA") based on 3GPP credentials in the 5G System ("5GS") (Release 17) is lacking the feature of roaming. Clause 4.4.0 "General" covers the following note—"Roaming aspects are not considered in the present document." Moreover, the issue is raised and described in the Legal Interception ("LI") specification group SA3-LI in the document S3i200477:

"AKMA, like the 3G/4G counterpart GBA (TS 33.220), derives security keys from the USIM application that in most cases can be used for encryption across the VPLMN, by creating an encrypted tunnel between the ME and a point outside the VPLMN, e.g., a point in the HPLMN or at an external OTT service provider. In both of these cases, without further technical means in place, it prevents LI to take place in the VPLMN as required. For encryption which the MNO has been involved in establishing, there is an LI requirement to provide either decrypted traffic or the means for law enforcement to decrypt the traffic. This requirement applies to mechanisms such as AKMA, where the MNO is involved in establishing and distributing key material for encryption. Furthermore, when roaming, LI needs to be possible to perform independently in each of the involved jurisdictions. In particular, activation of LI in the VPLMN needs to be carried out without explicit support from the HPLMN (it would otherwise leak information that the inbound roamer is LI target in the VPLMN)."

Due to the nature of AKMA in current normative specifications, e.g., 3GPP TS 33.535, in one embodiment, the UE always setups a secured tunnel to the Application Function ("AF"), wherever it is located, and the visited public land mobile network ("VPLMN") has no chance to perform LI on the traffic.

In one embodiment, the subject matter disclosed herein is directed to a UE that provides a Serving Network Name ("SN") to an application function ("AF") in the Application Session Establishment Request in order to route the Key request to the VPLMN. In one embodiment, the AF discovers the network exposure function ("NEF") in the VPLMN based on the SN and sends the AKMA $K_{AF}$ Request to the Visited AKMA Anchor Function ("V-AAnF") via the NEF. In one embodiment, the V-AANF detects based on the realm of the A-KID the home public land mobile network ("HPLMN") and selects an AAnF and sends the AKMA $K_{AF}$ request to the AAnF in the HPLMN. In one embodiment, the AAnF in the HPLMN verifies the request and generates the KAF and sends the response to the V-AAnF with the $K_{AF}$, the $K_{AF}$ expiration time (KAFexptime) and potentially other parameters.

In one embodiment, the subject matter disclosed herein includes an authentication server function ("AUSF") and a UE that use the SN as a realm for the A-KID. In one embodiment, the AUSF selects the V-AAnF or AMF based on the SN of the UE and provides the AKMA security context to the V-AAnF or AMF in the serving network. In one embodiment, the AF in the serving network sends the AKMA $K_{AF}$ request to the NEF in the serving network based on the realm of the A-KID.

In one embodiment, the subject matter disclosed herein includes an AAnF that queries the AUSF/UDM for the Serving Network Name or AAnF retrieves the Serving Network Name after primary authentication together with $K_{AKMA}$. Alternatively, AAnF retrieves Serving Network Name from AUSF with AKMA security context. In one embodiment, the AAnF selects a V-AAnF based on the serving network name. In one embodiment, the AAnF provides the AKMA security context to the V-AAnF.

FIG. 1 depicts a wireless communication system 100 for enabling roaming with authentication and key management for applications, according to embodiments of the disclosure. In one embodiment, the wireless communication system 100 includes at least one remote unit 105, a Fifth-Generation Radio Access Network ("5G-RAN") 115, and a mobile core network 140. The 5G-RAN 115 and the mobile core network 140 form a mobile communication network. The 5G-RAN 115 may be composed of a Third Generation Partnership Project ("3GPP") access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication 131, non-3GPP communication links 133, and mobile core networks 140 may be included in the wireless communication system 100.

In one implementation, the RAN 120 is compliant with the 5G system specified in the 3GPP specifications. For example, the RAN 120 may be a NextGen RAN ("NG-RAN"), implementing NR Radio Access Technology ("RAT") and/or Long Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the User Equipments ("UEs"), subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the cellular base units 121 in the 3GPP access network 120 via UL and DL communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or Packet Data Network ("PDN") connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a PDN connection (also referred to as EPS session) provides E2E UP connectivity between the remote unit and a PDN. The PDN connectivity procedure establishes an EPS Bearer, i.e., a tunnel between the remote unit 105 and a Packet Gateway ("P-GW"), not shown, in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (i.e., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the Access and Mobility Management Function ("AMF") 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF 141. The mobile core network 140 also includes multiple control plane functions including, but not limited to, an AMF 143 that serves the 5G-RAN 115, a Session Management Function ("SMF") 145, a Policy Control Function ("PCF") 147, an Authentication Server Function ("AUSF") 148, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of Non-Access Stratum ("NAS") signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 147 is responsible for unified policy framework, providing policy rules to Control Plane ("CP") functions, access subscription information for policy decisions in UDR. The AUSF 148 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a single Network Slice Selection Assistance Information ("S-NSSAI"), while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as a Mobility Management Entity ("MME"), Serving Gateway ("S-GW"), P-GW, Home Subscriber Server ("HSS"), and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfox, and the like. For example, in an 4G/LTE variant involving an EPC, the AMF 143 may be mapped to an MME, the SMF mapped to a control plane portion of a P-GW and/or to an MME, the UPF 141 may be mapped to an S-GW and a user plane portion of the P-GW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

As background, in general, the AKMA features are based on the Generic Bootstrapping Architecture ("GBA") (see 3GPP TS 33.220), which is designed for pre-5G generations of 3GPP networks. AKMA was designed to fulfil the new protocol requirements raised by the introduction of the Service Based Architecture ("SBA").

GBA defines roaming where the Network Application Function ("NAF") is located in the VPLMN. The NAF, in one embodiment, is the function that the UE establishes a secure connection with and because it is located in the VPLMN, LI is possible.

In general, the GBA architecture only considers the applications function (AF/NAF) in the VPLMN as the function that is hosting the encryption key. In this case, there would be no issue with the LI requirement, but the AF can be considered to be somewhere else in a different network, not limited to the VPLMN. In one embodiment, the AF may be located in the home public land mobile network ("HPLMN"), but it could also be a different network depending on the service and application, which does not solve the issue of LI. Also, in one embodiment, performing LI in the UPF of the VPLMN does not solve the issue because the traffic is still tunneled between the UE and the AF, and the UPF does not have the security context.

Therefore, as described herein, the AKMA security context is provisioned to the serving network either at the time of AKMA key generation or at the time of the session establishment from the UE. For this reason, a new function, the Visited AKMA Anchor Function ("V-AAnF") is introduced to receive the security context and to further relay it to the AF. For LI reasons, the key material can be retrieved from the V-AAnF in order to decrypt the connection between UE and AF.

Figure 2:
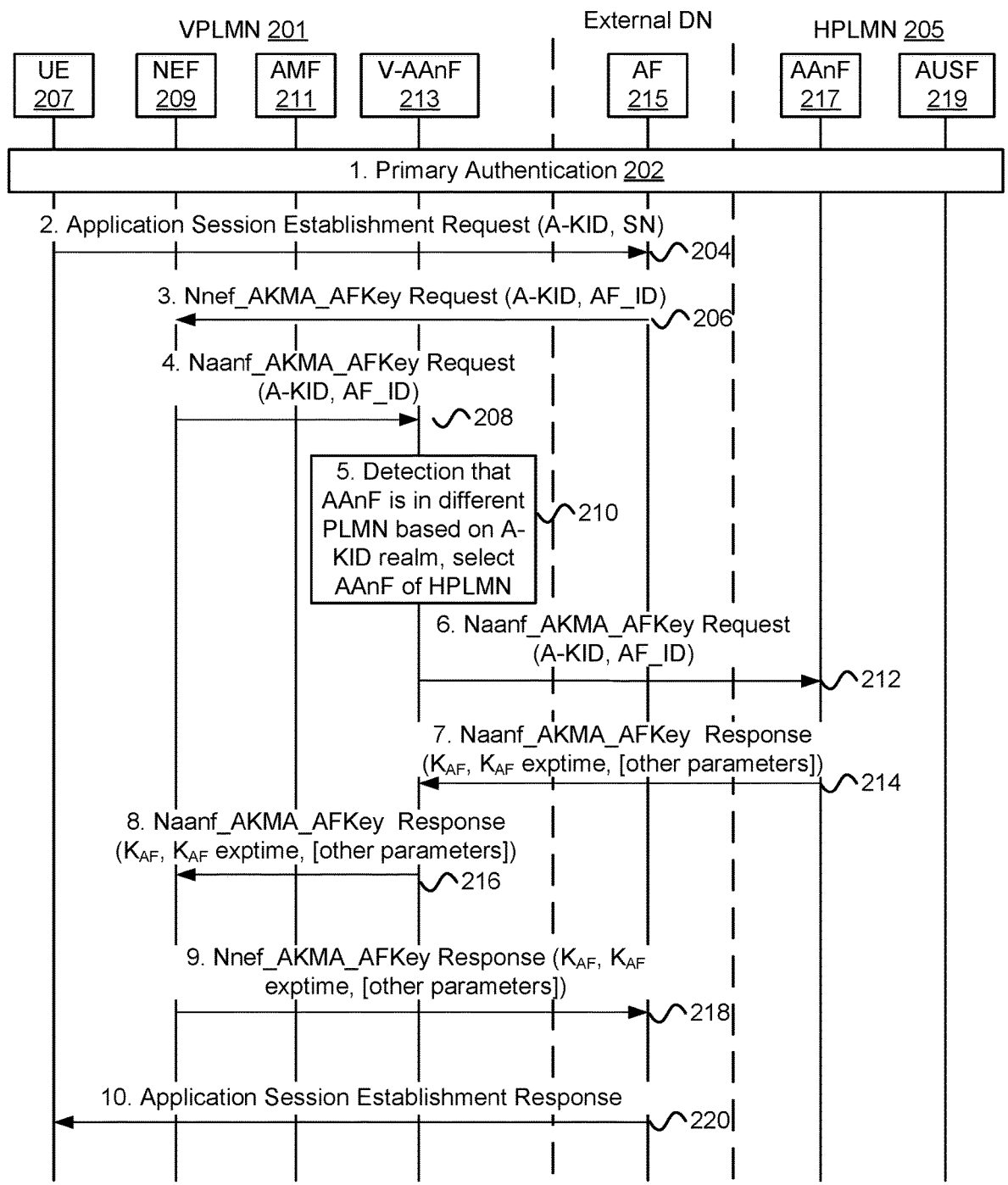
FIG. 2 depicts a procedure flow for key provisioning to V-AAnF at Application Session Establishment Request.

FIG. 2 depicts a procedure flow 200 for key provisioning to V-AAnF at Application Session Establishment Request. In one embodiment, the procedure 200 describes the usage of a V-AAnF as a proxy in the VPLMN to receive the AKMA security context from the HPLMN AAnF. The V-AAnF may provide the AKMA security context to the related LI network function on request.

In one embodiment, after primary authentication (see step 1, block 202) and before communication between the UE 207 and the AKMA AF 215 can start, the UE 207 and the AKMA AF 215 needs to know whether to use AKMA.

At step 2, in one embodiment, the UE 207 shall generate the AKMA Anchor Key ($K_{AKMA}$) and the AKMA key identifier A-KID from the $K_{AUSF}$ before initiating communication with an AKMA AF 215. In one embodiment, when the UE 207 initiates communication (see messaging 204) with the AKMA AF 215, it shall include the derived A-KID in the Application Session Establishment Request message. In one embodiment, the UE 207 may derive $K_{AF}$ before sending the message or afterwards. In one embodiment, the UE 207 includes the Serving Network Name ("SN") of the current VPLMN in the request.

At step 3, in one embodiment, when the AF 215 is about to request AKMA Application Key for the UE 207 from the AAnF 217, e.g., when the UE 207 initiates an application session establishment request, the AF 215 discovers the VPLMN 201 of the UE 207 based on the SN and sends the request (see messaging 206) towards the V-AAnF 213 via NEF 209 service API. The request, in one embodiment, shall include the A-KID and the AF_ID. The AF_ID, in one embodiment, consists of the fully qualified domain name ("FQDN") of the AF 215 and the Ua* security protocol identifier. The latter parameter, in one embodiment, identifies the security protocol that the AF 215 will use with the UE 207. The AF 215, in one embodiment, may directly send the request message to the V-AAnF 213 if no NEF 209 is required.

At step 4, in one embodiment, if the AF 215 is authorized by the NEF 209 to request $K_{AF}$, the NEF 209 discovers and selects a V-AAnF 213 and forwards (see messaging 208) the $K_{AF}$ request to the selected V-AAnF 213. In one embodiment, the V-AANF 213 detects (see block 210), based on the realm of the A-KID, the HPLMN 205 and selects an AAnF 217 within the HPLMN 205.

At step 6, in one embodiment, the V-AAnF 213 sends (see messaging 212) the AKMA $K_{AF}$ request to the AAnF 217 in the HPLMN 205.

At step 7, in one embodiment, the AAnF 217 verifies the request and generates the $K_{AF}$ and sends (see messaging 214) the response to the V-AAnF 213 with the $K_{AF}$, the $K_{AF}$ expiration time (KAFexptime), and potentially other parameters.

At step 8, in one embodiment, the V-AAnF 213 forwards (see messaging 216) the response to the NEF 209.

At step 9, in one embodiment, the NEF 209 forwards (see messaging 218) the response to the AF 215.

At step 10, in one embodiment, the AF 215 sends (see messaging 220) the Application Session Establishment Response to the UE 207.

Figure 3:
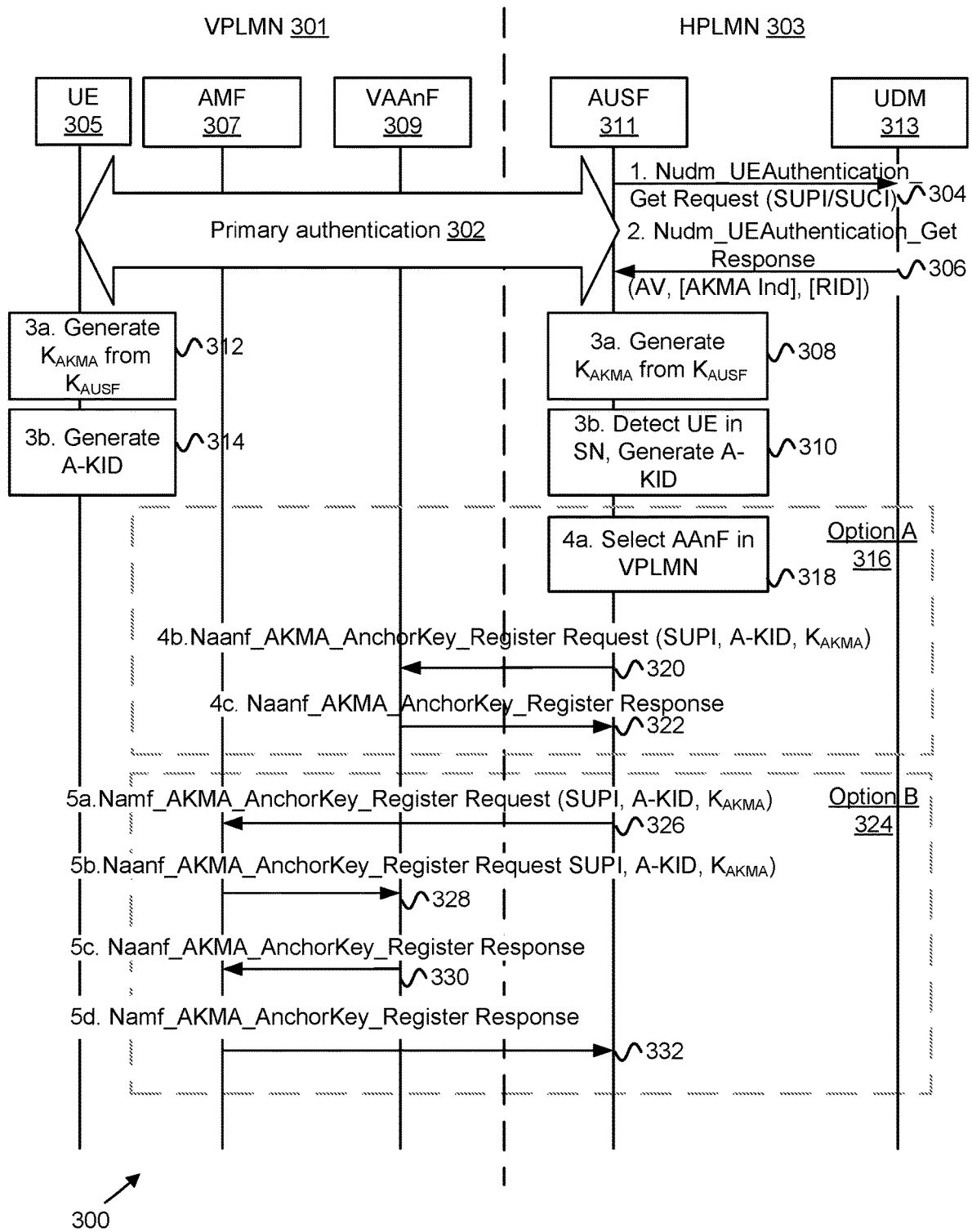
FIG. 3 depicts a procedure flow for key provisioning to V-AAnF at AKMA key generation.

FIG. 3 depicts a procedure flow 300 for key provisioning to V-AAnF at AKMA key generation.

At step 1, in one embodiment, during the primary authentication procedure (see block 302), the AUSF 311 interacts (see messaging 304) with the UDM 313 in order to fetch authentication information such as subscription credentials (e.g., AKA Authentication vectors) and the authentication method using the Nudm_UEAuthentication_Get Request service operation.

At step 2, in one embodiment, in the response message (see messaging 306), the UDM 313 may also indicate to the AUSF 311 whether AKMA anchor keys need to be generated for the UE 305. If the AKMA Ind is included, in one embodiment, the UDM 313 shall also include the RID of the UE 305.

At step 3, in one embodiment, if the AUSF 311 receives the AKMA indication from the UDM 313, the AUSF 311 shall store the $K_{AUSF}$ and generate (see block 308) the AKMA Anchor Key ($K_{AKMA}$) and the A-KID from $K_{AUSF}$ after the primary authentication procedure is successfully completed. The AUSF 311, in one embodiment, detects (see block 310) that the UE 305 is in a different serving network and uses the SN as realm for the A-KID.

In one embodiment, the UE 305 generates (see block 312) the AKMA Anchor Key ($K_{AKMA}$) and the A-KID (see block 314) from the $K_{AUSF}$ before initiating communication with an AKMA Application Function. The UE 305 uses the SN as realm for the A-KID respectively.

In a first option, Option A 316, in one embodiment, after AKMA key material is generated, the AUSF selects (see block 318) the V-AAnF 309 based on the SN of the UE 305 and sends (see messaging 320) the generated A-KID and $K_{AKMA}$ to the V-AAnF 309 together with the subscription permanent identifier ("SUPI") of the UE 305 using the Naanf_AKMA_KeyRegistration Request service operation. The V-AAnF 309, in one embodiment, stores the latest information sent by the AUSF 311 and sends (see messaging 322) the response to the AUSF 311 using the Naanf_AKMA_AnchorKey_Register Response service operation.

In a second option, Option B 324, in one embodiment, after AKMA key material is generated, the AUSF 311 selects the AMF 307 based on SN of the UE 305 and sends (see messaging 326) the generated A-KID and $K_{AKMA}$ to the AMF 307 together with the SUPI of the UE 305 using the Namf_AKMA_KeyRegistration Request service operation. The AMF 307, in one embodiment, selects the V-AAnF 309 and forwards (see messaging 328) the request in a Naanf_AKMA_KeyRegistration Request service operation. In one embodiment, the V-AAnF 309 stores the latest information sent by the AUSF 311. The V-AAnF 309 sends (see messaging 330) the response to the AMF 307, which forwards (see messaging 332) the response to the AUSF 311 using the Naanf_AKMA_AnchorKey_Register Response service operation via the AMF 307.

In one embodiment, the A-KID identifies the $K_{AKMA}$ key of the UE 305. In further embodiments, the A-KID shall be in network access identifier ("NAI") format, e.g., username@realm. The username part may include the RID and the AKMA Temporary UE Identifier ("A-TID"), and the realm part may include Visited Network Identifier (e.g., SN). In one embodiment, the A-TID may be derived from $K_{AUSF}$. The AUSF 311 may use the RID received from the UDM 313 to derive A-KID.

In one embodiment, if the UE sends an Application Session Establishment Request to the AF, the AF routes the request to the NEF or AAnF in the serving network (e.g., VPLMN) based on the SN of the A-KID. The procedure, in one embodiment, is valid if the UE remains in the HPLMN or roams in the VPLMN.

Figure 4:
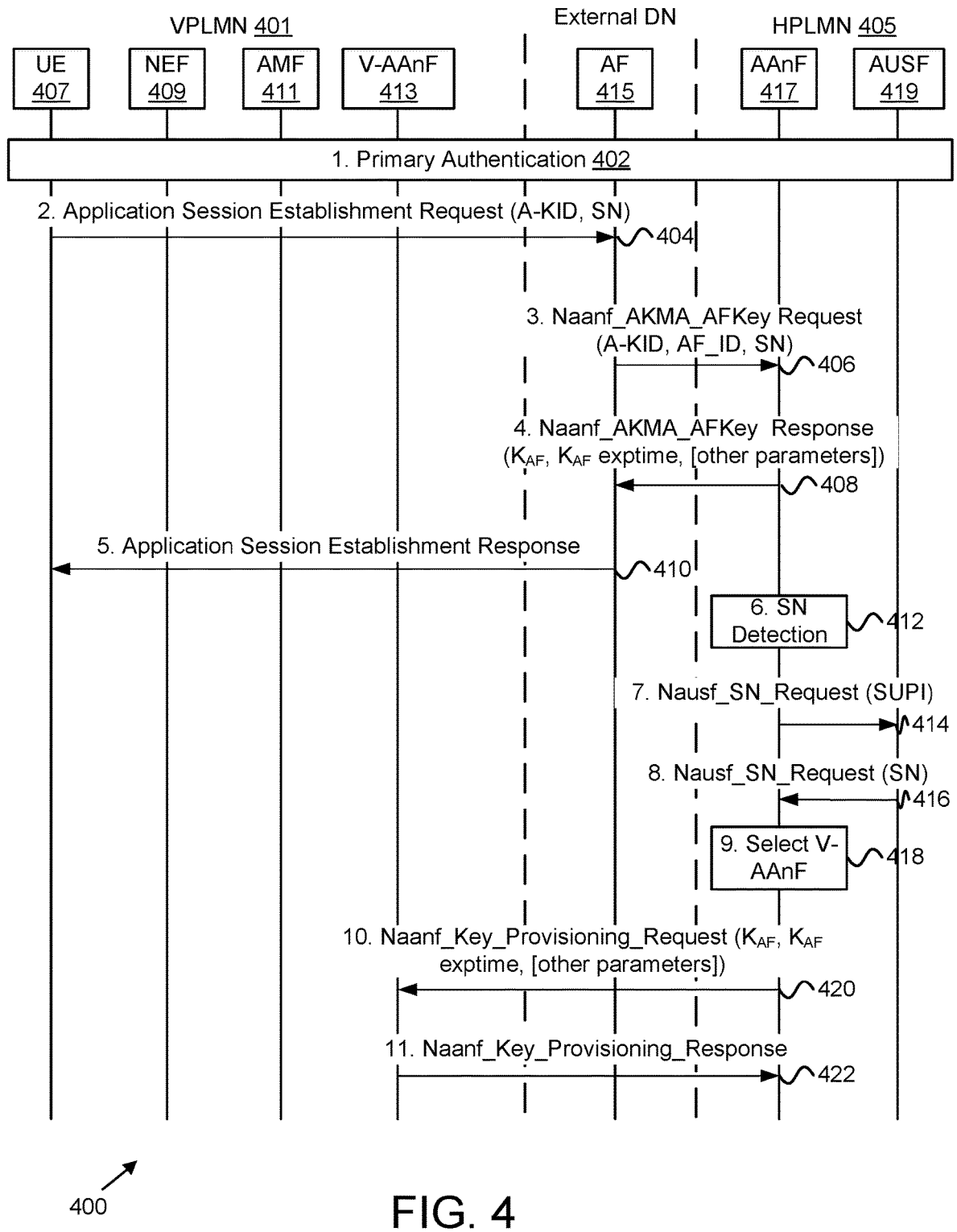
FIG. 4 depicts a procedure flow for key provisioning to V-AAnF after AF provisioning.

FIG. 4 depicts a procedure flow 400 for key provisioning to V-AAnF after AF provisioning.

At step 1, in one embodiment, after primary authentication (see block 402) and before communication between the UE 407 and the AKMA AF 415 can start, the UE 407 and the AKMA AF 415 needs to know whether to use AKMA.

At step 2, in one embodiment, the UE 407 generates the AKMA Anchor Key ($K_{AKMA}$) and the A-KID from the $K_{AUSF}$ before initiating communication with an AKMA AF 415. When the UE 407 initiates communication (see messaging 404) with the AKMA AF 415, in one embodiment, it may include the derived A-KID in the Application Session Establishment Request message. In one embodiment, the UE 407 may derive $K_{AF}$ before sending the message or afterwards. The UE 407 may include the Serving Network Name ("SN") of the current VPLMN 401 in the request.

At step 3, in one embodiment, when the AF 415 is about to request AKMA Application Key for the UE 407 from the AAnF 417, e.g., when UE 407 initiates application session establishment request, the AF 415 sends (see messaging 406) the request towards the AAnF 417 via NEF service API (not shown). The request may include the A-KID and the AF_ID and the Serving Network Name (SN) if available. The AF_ID, in one embodiment, consists of the FQDN of the AF and the Ua* security protocol identifier. The latter parameter, in one embodiment, identifies the security protocol that the AF 415 will use with the UE 407. The AF 415 may directly send the request message to the AAnF 417 if no NEF is required.

In one embodiment, at step 4, the AAnF verifies the request, generates the $K_{AF}$, and sends (see messaging 408) the response to the AF 415 with the $K_{AF}$, the $K_{AF}$ expiration time (KAFexptime), and potentially other parameters.

At step 5, in one embodiment, the AF 415 sends (see messaging 410) the Application Session Establishment Response to the UE 407.

Figure 5:
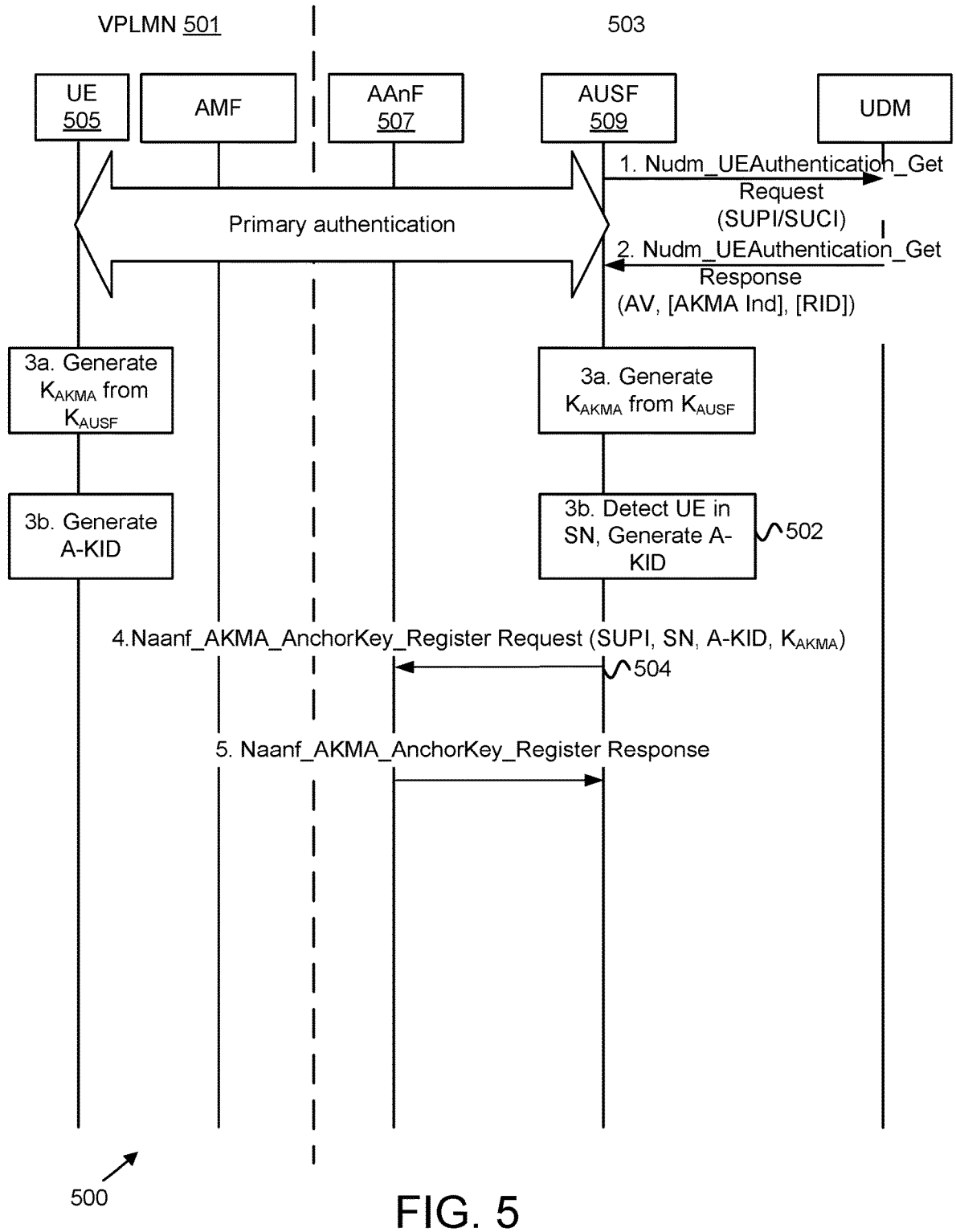
FIG. 5 depicts a procedure flow for provisioning the serving network name.

At step 6, in one embodiment, if the UE 407 included the Serving Network Name in step 1, then the AAnF 417 detects (see block 412) that the UE 407 is not located in the HPLMN 405 and is located in a different network. Alternatively, in one embodiment, the AUSF 419 provides the Serving Network Name together with the $K_{AKMA}$ after primary authentication as shown in FIG. 5, step 4. The AAnF 417 may skip steps 7 and 8 in this case.

At step 7, in one embodiment, the AAnF 417 sends (see messaging 414) a Serving Network Name request to the AUSF 419 and includes the SUPI of the UE 407. Alternatively, the AAnF 417 may directly contact the UDM about the Serving Network Name. The AUSF 419 may contact the UDM if the Serving Network Name is not stored anymore for the specific SUPI.

At step 8, in one embodiment, the AUSF 419 or UDM provides (see messaging 416) the Serving Network Name back to the AAnF 417.

At step 9, in one embodiment, the AAnF 417 uses the Serving Network Name to select (see block 418) a V-AAnF 413 in the serving network.

At step 10, in one embodiment, the AAnF 417 sends (see messaging 420) a Key Provisioning Request to the V-AAnF 413 with the $K_{AF}$, the $K_{AF}$ expiration time (KAFexptime), the SUPI, the A-KID, and potentially other parameters. The V-AAnF 413, in one embodiment, stores the information for potential requests for legal interception.

At step 11, in one embodiment, the V-AAnF 413 acknowledges the request and sends (see messaging 422) a Key Provisioning Response back to the AAnF 417.

FIG. 5 depicts a procedure flow 500 for provisioning the serving network name. In one embodiment, the AUSF 509 detects (see block 502) that the UE 505 is in a different PLMN 501 based on the Serving Network Name used in previously primary authentication for the $K_{SEAF}$ key derivation. The AUSF 509, in one embodiment, provides the Serving Network Name together with the other security parameters to the AAnF 507 in step 4 (see messaging 504). The AAnF 507 can then select an AAnF 507 in the serving network at a later key request from an AF.

Figure 6:
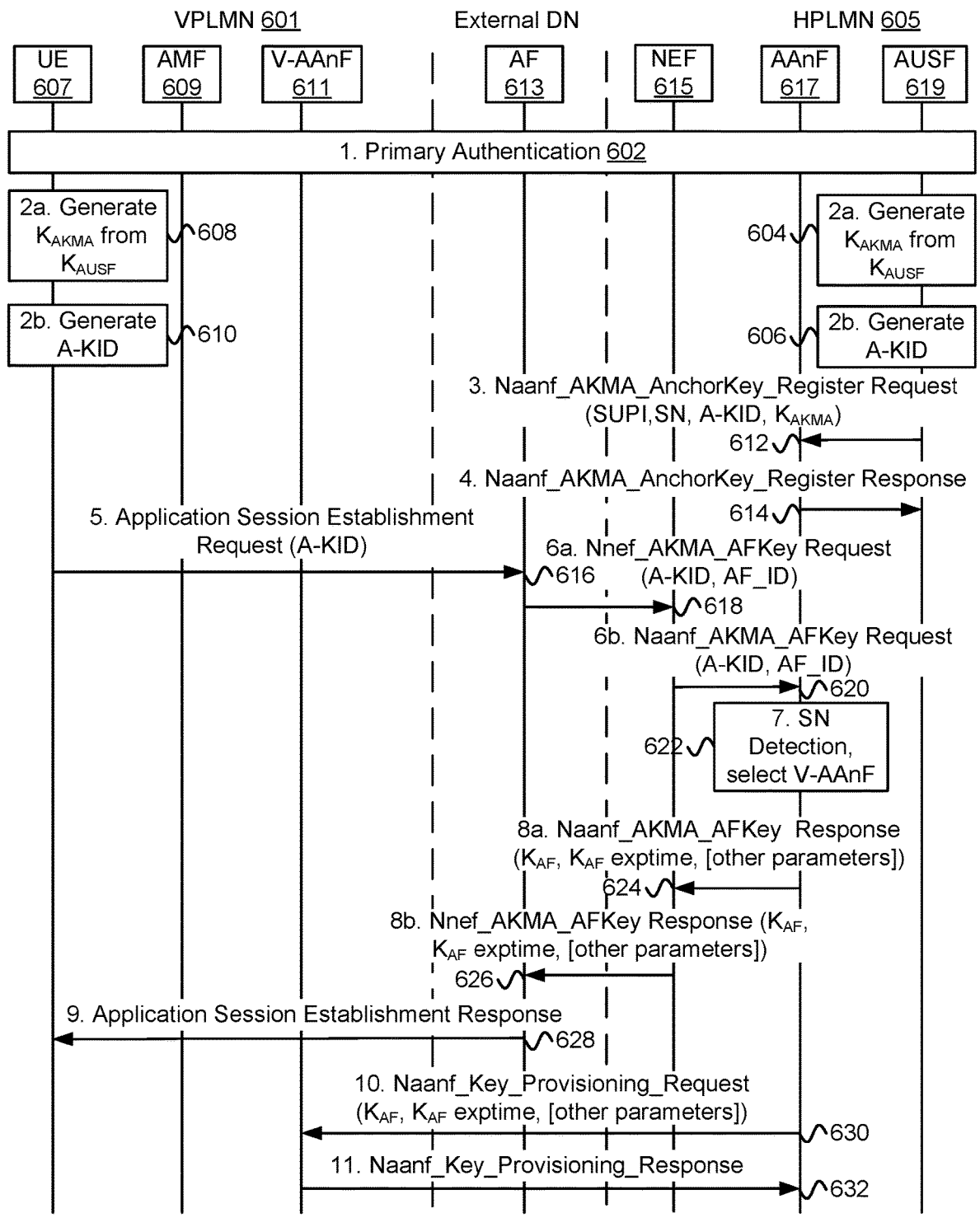
FIG. 6 depicts a procedure flow for provisioning the serving network name and V-AAnF selection.

FIG. 6 depicts a procedure flow 600 for provisioning the serving network name and V-AAnF selection.

In one embodiment, at step 1, during the primary authentication procedure (see block 602), the AUSF 619 interacts with the UDM in order to fetch authentication information such as subscription credentials (e.g., AKA Authentication vectors) and the authentication method using the Nudm_UEAuthentication_Get Request service operation.

In one embodiment, at step 2, if the AUSF 619 receives the AKMA indication from the UDM, the AUSF 619 shall store the $K_{AUSF}$ and generate the AKMA Anchor Key ($K_{AKMA}$) (see block 604) and the A-KID (see block 606) from $K_{AUSF}$ after the primary authentication procedure is successfully completed. In one embodiment, the UE 607 generates the AKMA Anchor Key ($K_{AKMA}$) (see block 608) and the A-KID (see block 610) from the $K_{AUSF}$ before initiating communication with an AKMA Application Function.

In one embodiment, at step 3, after AKMA key material is generated, the AUSF 619 selects the AAnF 617 and sends (see messaging 612) the generated A-KID and $K_{AKMA}$ to the AAnF 617 together with the SUPI of the UE 607 and the Serving Network Name using the Naanf_AKMA_KeyRegistration Request service operation.

At step 4, in one embodiment, the AAnF 617 stores the latest information sent by the AUSF 619 and sends (see messaging 614) a Naanf_AKMA_AnchorKey_Register response to the AUSF 619.

At step 5, in one embodiment, the UE 607 generates the AKMA Anchor Key ($K_{AKMA}$) and the A-KID from the $K_{AUSF}$ before initiating communication with an AKMA AF 613. When the UE 607 initiates communication (see messaging 616) with the AKMA AF 613, in one embodiment, it includes the derived A-KID in the Application Session Establishment Request message. In one embodiment, the UE 607 derives $K_{AF}$ before or after sending the message.

In one embodiment, at step 6, when the AF 613 is about to request the AKMA Application Key for the UE 607 from the AAnF 617, e.g., when UE 607 initiates application session establishment request, the AF 613 sends (see messaging 618) the request towards the AAnF 617 via a NEF 615 service API. The request may include the A-KID and the AF_ID. The AF_ID, in one embodiment, consists of the FQDN of the AF 613 and the Ua* security protocol identifier. The latter parameter, in one embodiment, identifies the security protocol that the AF 613 will use with the UE 607. The AF 613 may directly send the request message to the AAnF 617 if no NEF 615 is required; otherwise, the NEF 615 sends (see messaging 620) the request to the AAnF 617.

At step 7, in one embodiment, the AAnF 617 detects (see block 622), based on the SN name where the UE 607 is roaming, and:

if the VPLMN 601 has no AKMA LI enhancements, but does have a LI policy, then the AAnF 617 may not provide the $K_{AF}$ to the AF 613 and indicates a NULL encryption;

if the VPLMN 601 has AKMA LI enhancements, then the AAnF 617 provides the $K_{AF}$ and the $K_{AF}$ expiration time together with the SUPI of the UE 607 to the network function for storing the AKMA LI context, e.g., a V-AAnF 611 in the VPLMN 601.

VPLMN 601 AKMA capabilities and policies, and the network function, e.g., V-AAnF address, may be configured in the AAnF 617 and may be based on service level agreements ("SLAs").

At step 8, in one embodiment, the AAnF 617 verifies the request and generates the $K_{AF}$ and sends the response to the AF 613 with the $K_{AF}$, the $K_{AF}$ expiration time (KAFexptime) and potentially other parameters. The AAnF 617 sends the response either directly to the AF 613, or via the NEF 615 (see messaging 624 and 626).

In one embodiment, at step 9, the AF 613 sends (see messaging 628) the Application Session Establishment Response to the UE 607.

At step 10, in one embodiment, the AAnF 617 sends (see messaging 630) a Key Provisioning Request to the V-AAnF 611 with the $K_{AF}$, the $K_{AF}$ expiration time (KAFexptime), the SUPI, the A-KID, and potentially other parameters. The V-AAnF 611, in one embodiment, stores the information for potential requests for legal interception.

At step 11, in one embodiment, the V-AAnF 611 acknowledges the request and sends (see messaging 632) a Key Provisioning Response back to the AAnF 617.

Figure 7:
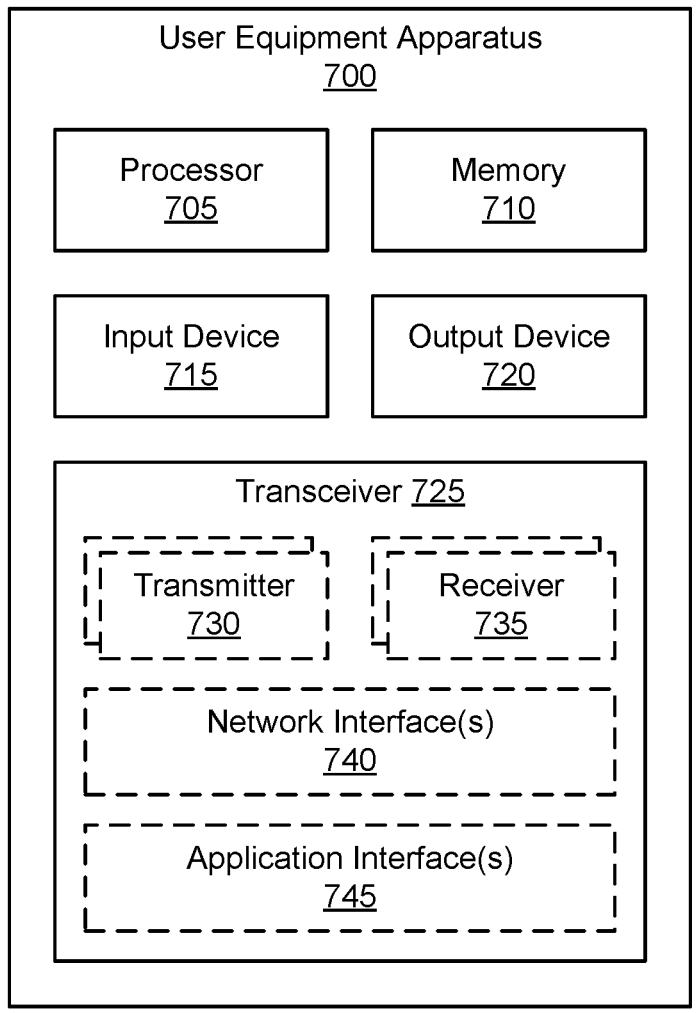
FIG. 7 is a block diagram illustrating one embodiment of a user equipment apparatus that may be used for enabling roaming with authentication and key management for applications.

FIG. 7 depicts a user equipment apparatus 700 that may be used for enabling roaming with authentication and key management for applications, according to embodiments of the disclosure. In various embodiments, the user equipment apparatus 700 is used to implement one or more of the solutions described above. The user equipment apparatus 700 may be one embodiment of the remote unit 105 and/or the UE, described above. Furthermore, the user equipment apparatus 700 may include a processor 705, a memory 710, an input device 715, an output device 720, and a transceiver 725.

In some embodiments, the input device 715 and the output device 720 are combined into a single device, such as a touchscreen. In certain embodiments, the user equipment apparatus 700 may not include any input device 715 and/or output device 720. In various embodiments, the user equipment apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. In some embodiments, the transceiver 725 communicates with one or more cells (or wireless coverage areas) supported by one or more base units 121. In various embodiments, the transceiver 725 is operable on unlicensed spectrum. Moreover, the transceiver 725 may include multiple UE panel supporting one or more beams. Additionally, the transceiver 725 may support at least one network interface 740 and/or application interface 745. The application interface(s) 745 may support one or more APIs. The network interface(s) 740 may support 3GPP reference points, such as Uu, N1, PC5, etc. Other network interfaces 740 may be supported, as understood by one of ordinary skill in the art.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725. In certain embodiments, the processor 705 may include an application processor (also known as "main processor") which manages application-domain and operating system ("OS") functions and a baseband processor (also known as "baseband radio processor") which manages radio functions.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to enabling roaming with authentication and key management for applications. For example, the memory 710 may store various parameters, panel/beam configurations, resource assignments, policies, and the like as described above. In certain embodiments, the memory 710 also stores program code and related data, such as an operating system or other controller algorithms operating on the user equipment apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the user equipment apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all, or portions of the output device 720 may be integrated with the input device 715. For example, the input device 715 and output device 720 may form a touchscreen or similar touch-sensitive display. In other embodiments, the output device 720 may be located near the input device 715.

The transceiver 725 communicates with one or more network functions of a mobile communication network via one or more access networks. The transceiver 725 operates under the control of the processor 705 to transmit messages, data, and other signals and also to receive messages, data, and other signals. For example, the processor 705 may selectively activate the transceiver 725 (or portions thereof) at particular times in order to send and receive messages.

The transceiver 725 includes at least transmitter 730 and at least one receiver 735. One or more transmitters 730 may be used to provide UL communication signals to a base unit 121, such as the UL transmissions described herein. Similarly, one or more receivers 735 may be used to receive DL communication signals from the base unit 121, as described herein. Although only one transmitter 730 and one receiver 735 are illustrated, the user equipment apparatus 700 may have any suitable number of transmitters 730 and receivers 735. Further, the transmitter(s) 730 and the receiver(s) 735 may be any suitable type of transmitters and receivers. In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 725, transmitters 730, and receivers 735 may be implemented as physically separate components that access a shared hardware resource and/or software resource, such as for example, the network interface 740.

In various embodiments, one or more transmitters 730 and/or one or more receivers 735 may be implemented and/or integrated into a single hardware component, such as a multi-transceiver chip, a system-on-a-chip, an ASIC, or other type of hardware component. In certain embodiments, one or more transmitters 730 and/or one or more receivers 735 may be implemented and/or integrated into a multi-chip module. In some embodiments, other components such as the network interface 740 or other hardware components/circuits may be integrated with any number of transmitters 730 and/or receivers 735 into a single chip. In such embodiment, the transmitters 730 and receivers 735 may be logically configured as a transceiver 725 that uses one more common control signals or as modular transmitters 730 and receivers 735 implemented in the same hardware chip or in a multi-chip module.

Figure 8:
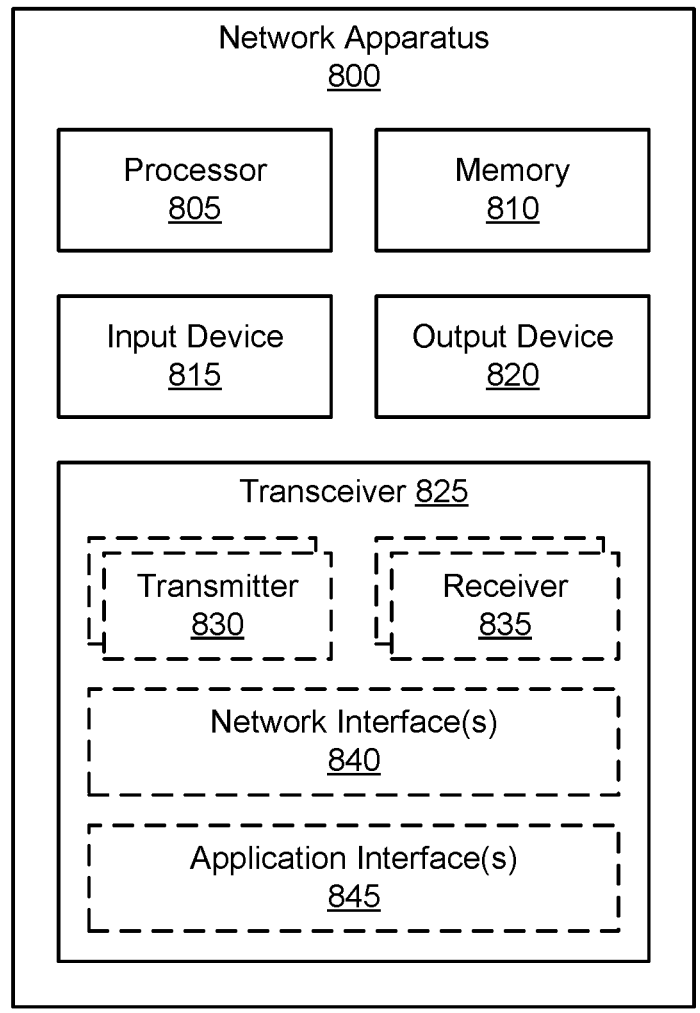
FIG. 8 is a block diagram illustrating one embodiment of a network apparatus that may be used for enabling roaming with authentication and key management for applications.

FIG. 8 depicts a network apparatus 800 that may be used for enabling roaming with authentication and key management for applications, according to embodiments of the disclosure. In one embodiment, network apparatus 800 may be one implementation of a RAN node, such as the base unit 121, the RAN node 210, or gNB, described above. Furthermore, the base network apparatus 800 may include a processor 805, a memory 810, an input device 815, an output device 820, and a transceiver 825.

In some embodiments, the input device 815 and the output device 820 are combined into a single device, such as a touchscreen. In certain embodiments, the network apparatus 800 may not include any input device 815 and/or output device 820. In various embodiments, the network apparatus 800 may include one or more of: the processor 805, the memory 810, and the transceiver 825, and may not include the input device 815 and/or the output device 820.

As depicted, the transceiver 825 includes at least one transmitter 830 and at least one receiver 835. Here, the transceiver 825 communicates with one or more remote units 105. Additionally, the transceiver 825 may support at least one network interface 840 and/or application interface 845. The application interface(s) 845 may support one or more APIs. The network interface(s) 840 may support 3GPP reference points, such as Uu, N1, N2 and N3. Other network interfaces 840 may be supported, as understood by one of ordinary skill in the art.

The processor 805, in one embodiment, may include any known controller capable of executing computer-readable instructions and/or capable of performing logical operations. For example, the processor 805 may be a microcontroller, a microprocessor, a CPU, a GPU, an auxiliary processing unit, a FPGA, or similar programmable controller. In some embodiments, the processor 805 executes instructions stored in the memory 810 to perform the methods and routines described herein. The processor 805 is communicatively coupled to the memory 810, the input device 815, the output device 820, and the transceiver 825. In certain embodiments, the processor 805 may include an application processor (also known as "main processor") which manages application-domain and operating system ("OS") functions and a baseband processor (also known as "baseband radio processor") which manages radio function.

In various embodiments, the network apparatus 800 is a RAN node (e.g., gNB) that includes a processor 805 and a transceiver 825. In one embodiment, the processor 805 determines a serving network of a user equipment ("UE") device, the serving network comprising a visited public land mobile network ("VPLMN") that is different from a home PLMN ("HPLMN") associated with the UE. In one embodiment, the processor 805 selects a network function within the serving network for provisioning an authentication and key management for applications ("AKMA") security context for an application function ("AF") based on a name for the serving network. In one embodiment, the transceiver 825 sends the security context to the network function.

In one embodiment, the processor 805 determines the serving network of the UE by detecting that the UE is in serving network. In one embodiment, the processor 805 generates AKMA key information $K_{AKMA}$ and an AKMA key identifier A-KID. In one embodiment, the transceiver 825 sends a registration request message to the selected network function based on the serving network name, the registration request message comprising the AKMA security context including the $K_{AKMA}$, the A-KID, and a Subscription Permanent Identifier ("SUPI") for the UE. In one embodiment, the transceiver 825 receives a registration response message from the selected network function for establishing a connection between the UE and the AF of the serving network.

In one embodiment, the selected network function comprises one of an access and mobility management function ("AMF") and a visited AKMA anchor function ("V-AAnF"). In one embodiment, the processor 805 determines the serving network of the UE by at least one of querying an authentication server function ("AUSF") of the HPLMN for the serving network name, retrieving the serving network name during primary authentication with the UE, and receiving the serving network name from the AUSF together with the AKMA key information $K_{AKMA}$.

In one embodiment, the serving network name is received from the AUSF in response to a serving network name request, the serving network name request comprising a Subscription Permanent Identifier ("SUPI") for the UE.

In one embodiment, the transceiver 825 sends a key provisioning request to the selected network function within the serving network, the key provisioning request comprising the AKMA security context including key information for the AKMA AF $K_{AF}$, an expiration time for the $K_{AF}$, a Subscription Permanent Identifier ("SUPI") for the UE, and an AKMA key identifier A-KID. In one embodiment, the transceiver 825 receives a key provisioning response message from the selected network function.

In one embodiment, the transceiver 825 receives a key request from an AF at a network function of the HPLMN associated with the UE, the key registration request for provisioning the AKMA security context for the AF for establishing a connection between the UE and the AF of the serving network. In one embodiment, the processor 805 detects that the serving network comprising the VPLMN that is different from the HPLMN associated with the UE is not enhanced with a network function within the serving network for provisioning the AKMA security context. In one embodiment, the transceiver 825 sends a key response to the AF, the key response comprising an indication of NULL encryption and a Subscription Permanent Identifier ("SUPI") for the UE.

In one embodiment, the transceiver 825 receives an AKMA key information request for the AKMA AF $K_{AF}$ from the serving network. In one embodiment, the processor 805 verifies the AKMA key information request. In one embodiment, in response to verifying the AKMA key information request, the processor 805 generates the AKMA AF $K_{AF}$ and the transceiver sends an AKMA key information response to the serving network comprising the AKMA AF $K_{AF}$ and an expiration time for the $K_{AF}$.

In one embodiment, the transceiver 825 receives a key request at a network function of a serving network of a user equipment ("UE") device, the serving network comprising a visited public land mobile network ("VPLMN") that is different from a home PLMN ("HPLMN") associated with the UE, the key registration request for provisioning an authentication and key management for applications ("AKMA") security context for an application function ("AF") based on a name for the serving network for establishing a connection between the UE and the AF. In one embodiment, the transceiver 825 sends a key response to a network function of the HPLMN.

In one embodiment, the processor 805 stores the security context information at the network function of the serving network. In one embodiment, the network function of the serving network comprises one of an access and mobility management function ("AMF") and a visited AKMA anchor function ("V-AAnF").

In one embodiment, the processor 805 detects that the key request is from an AAnF in the HPLMN based on an AKMA key identifier A-KID. In one embodiment, the transceiver 825 sends the key request to the AAnF in the HPLMN and receives a key response from the AAnF of the HPLMN comprising key information for the AKMA AF $K_{AF}$ and an expiration time for the $K_{AF}$.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media.

In some embodiments, the memory 810 stores data related to enabling roaming with authentication and key management for applications. For example, the memory 810 may store parameters, configurations, resource assignments, policies, and the like, as described above. In certain embodiments, the memory 810 also stores program code and related data, such as an operating system or other controller algorithms operating on the network apparatus 800.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, is designed to output visual, audible, and/or haptic signals. In some embodiments, the output device 820 includes an electronically controllable display or display device capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display separate from, but communicatively coupled to, the rest of the network apparatus 800, such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all, or portions of the output device 820 may be integrated with the input device 815. For example, the input device 815 and output device 820 may form a touchscreen or similar touch-sensitive display. In other embodiments, the output device 820 may be located near the input device 815.

The transceiver 825 includes at least transmitter 830 and at least one receiver 835. One or more transmitters 830 may be used to communicate with the UE, as described herein. Similarly, one or more receivers 835 may be used to communicate with network functions in the non-public network ("NPN"), PLMN and/or RAN, as described herein. Although only one transmitter 830 and one receiver 835 are illustrated, the network apparatus 800 may have any suitable number of transmitters 830 and receivers 835. Further, the transmitter(s) 830 and the receiver(s) 835 may be any suitable type of transmitters and receivers.

Figure 9:
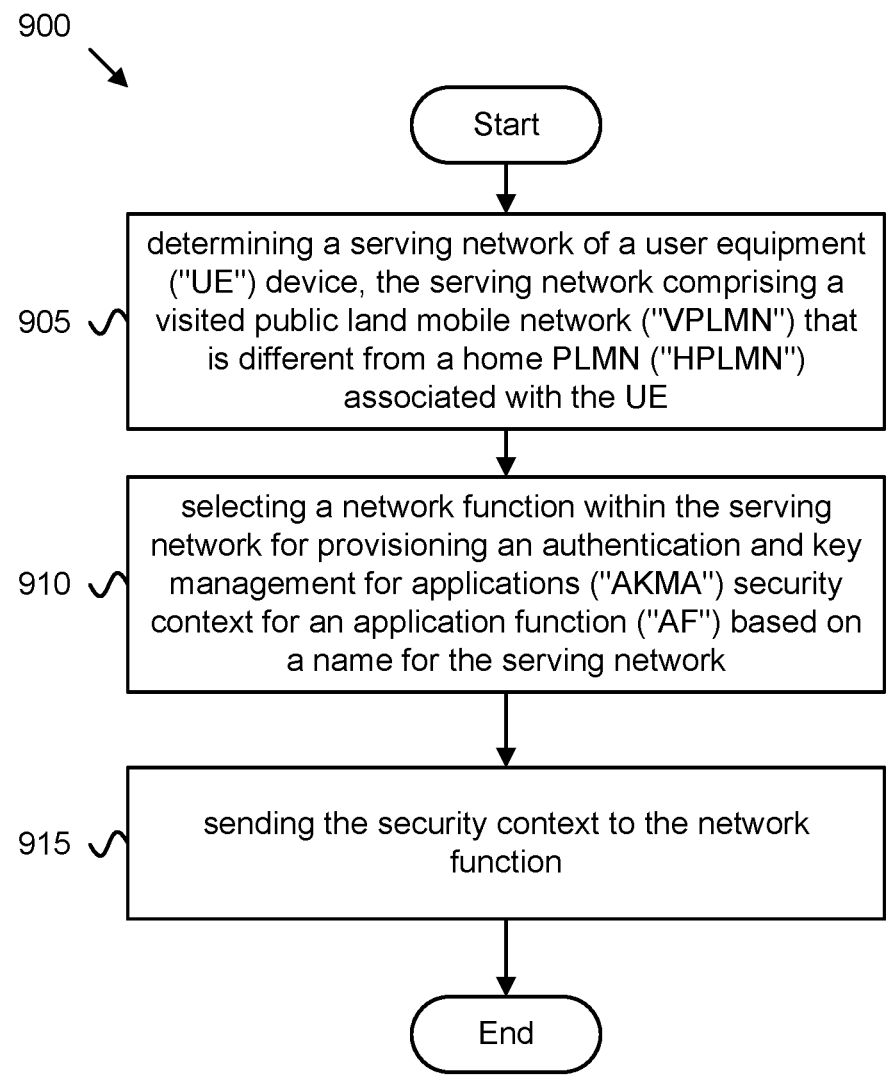
FIG. 9 is a flowchart diagram illustrating one embodiment of a method for enabling roaming with authentication and key management for applications.

FIG. 9 is a flowchart diagram of a method 900 for enabling roaming with authentication and key management for applications. The method 900 may be performed by a UE as described herein, for example, the remote unit 105, the UE and/or the user equipment apparatus 700 and/or a network entity such as a base node, a gNB, and/or the network equipment apparatus 800. In some embodiments, the method 900 may be performed by a processor executing program code, for example, a microcontroller, a microprocessor, a CPU, a GPU, an auxiliary processing unit, a FPGA, or the like.

In one embodiment, the method 900 includes determining 905 a serving network of a user equipment ("UE") device, the serving network comprising a visited public land mobile network ("VPLMN") that is different from a home PLMN ("HPLMN") associated with the UE. In one embodiment, the method 900 includes selecting 910 a network function within the serving network for provisioning an authentication and key management for applications ("AKMA") security context for an application function ("AF") based on a name for the serving network. In one embodiment, the method 900 includes sending 915 the security context to the network function, and the method 900 ends.

Figure 10:
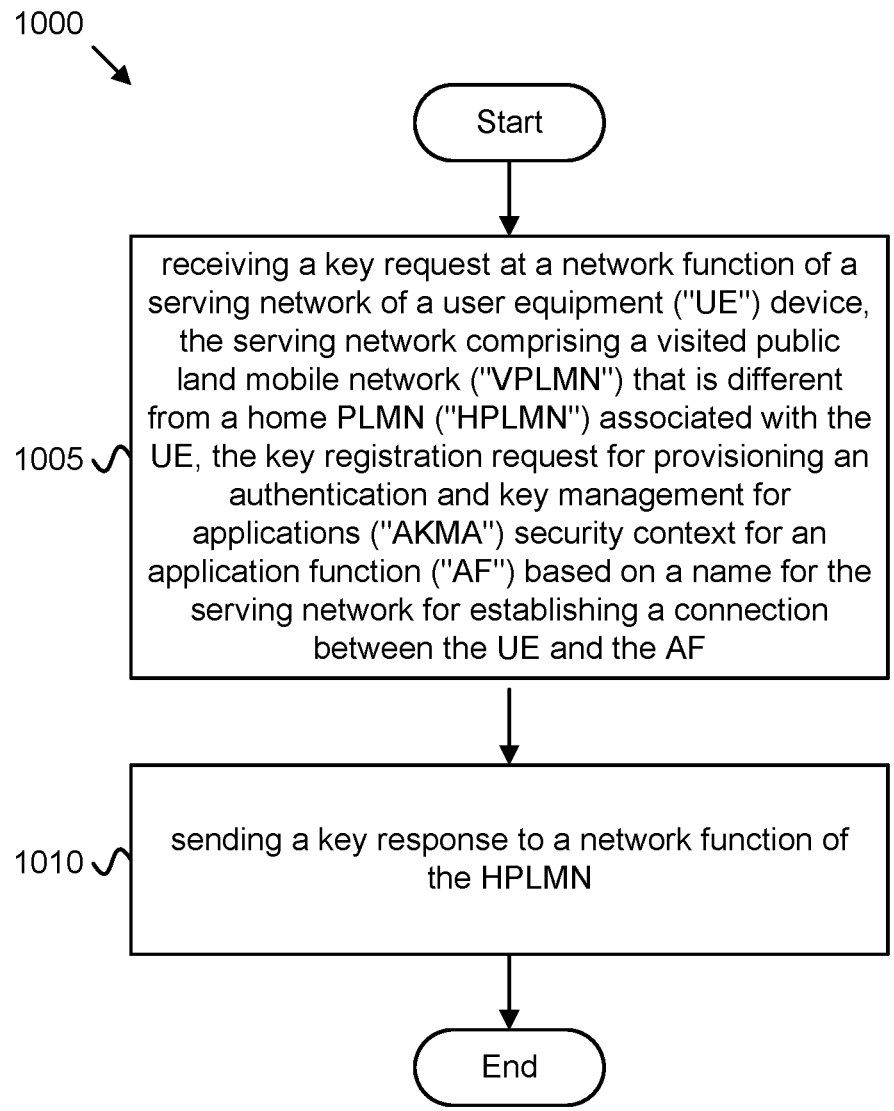
FIG. 10 is a flowchart diagram illustrating one embodiment of another method for enabling roaming with authentication and key management for applications.

FIG. 10 is a flowchart diagram of a method 1000 for enabling roaming with authentication and key management for applications. The method 1000 may be performed by a UE as described herein, for example, the remote unit 105, the UE and/or the user equipment apparatus 700 and/or a network entity such as a base node, a gNB, and/or the network equipment apparatus 800. In some embodiments, the method 1000 may be performed by a processor executing program code, for example, a microcontroller, a microprocessor, a CPU, a GPU, an auxiliary processing unit, a FPGA, or the like.

In one embodiment, the method 1000 includes receiving 1005 a key request at a network function of a serving network of a user equipment ("UE") device, the serving network comprising a visited public land mobile network ("VPLMN") that is different from a home PLMN ("HPLMN") associated with the UE, the key registration request for provisioning an authentication and key management for applications ("AKMA") security context for an application function ("AF") based on a name for the serving network for establishing a connection between the UE and the AF. In one embodiment, the method 1000 includes sending 1010 a key response to a network function of the HPLMN, and the method 1100 ends.

A first apparatus is disclosed for enabling roaming with authentication and key management for applications. The first apparatus may include a UE as described herein, for example, the remote unit 105, the UE and/or the user equipment apparatus 700 and/or a network entity such as a base node, a gNB, and/or the network equipment apparatus 800. In some embodiments, the first apparatus may include a processor executing program code, for example, a microcontroller, a microprocessor, a CPU, a GPU, an auxiliary processing unit, a FPGA, or the like.

In one embodiment, the first apparatus includes a processor that determines a serving network of a user equipment ("UE") device, the serving network comprising a visited public land mobile network ("VPLMN") that is different from a home PLMN ("HPLMN") associated with the UE. In one embodiment, the processor selects a network function within the serving network for provisioning an authentication and key management for applications ("AKMA") security context for an application function ("AF") based on a name for the serving network. In one embodiment, the first apparatus includes a transceiver that sends the security context to the network function.

In one embodiment, the processor determines the serving network of the UE by detecting that the UE is in serving network. In one embodiment, the processor generates AKMA key information $K_{AKMA}$ and an AKMA key identifier A-KID. In one embodiment, the transceiver sends a registration request message to the selected network function based on the serving network name, the registration request message comprising the AKMA security context including the $K_{AKMA}$, the A-KID, and a Subscription Permanent Identifier ("SUPI") for the UE. In one embodiment, the transceiver receives a registration response message from the selected network function for establishing a connection between the UE and the AF of the serving network.

In one embodiment, the selected network function comprises one of an access and mobility management function ("AMF") and a visited AKMA anchor function ("V-AAnF"). In one embodiment, the processor determines the serving network of the UE by at least one of querying an authentication server function ("AUSF") of the HPLMN for the serving network name, retrieving the serving network name during primary authentication with the UE, and receiving the serving network name from the AUSF together with the AKMA key information $K_{AKMA}$.

In one embodiment, the serving network name is received from the AUSF in response to a serving network name request, the serving network name request comprising a Subscription Permanent Identifier ("SUPI") for the UE.

In one embodiment, the transceiver sends a key provisioning request to the selected network function within the serving network, the key provisioning request comprising the AKMA security context including key information for the AKMA AF $K_{AF}$, an expiration time for the $K_{AF}$, a Subscription Permanent Identifier ("SUPI") for the UE, and an AKMA key identifier A-KID. In one embodiment, the transceiver receives a key provisioning response message from the selected network function.

In one embodiment, the transceiver receives a key request from an AF at a network function of the HPLMN associated with the UE, the key registration request for provisioning the AKMA security context for the AF for establishing a connection between the UE and the AF of the serving network. In one embodiment, the processor detects that the serving network comprising the VPLMN that is different from the HPLMN associated with the UE is not enhanced with a network function within the serving network for provisioning the AKMA security context. In one embodiment, the transceiver sends a key response to the AF, the key response comprising an indication of NULL encryption and a Subscription Permanent Identifier ("SUPI") for the UE.

In one embodiment, the transceiver receives an AKMA key information request for the AKMA AF $K_{AF}$ from the serving network. In one embodiment, the processor verifies the AKMA key information request. In one embodiment, in response to verifying the AKMA key information request, the processor generates the AKMA AF $K_{AF}$ and the transceiver sends an AKMA key information response to the serving network comprising the AKMA AF $K_{AF}$ and an expiration time for the $K_{AF}$.

A first method is disclosed for enabling roaming with authentication and key management for applications. The first method may be performed by a UE as described herein, for example, the remote unit 105, the UE and/or the user equipment apparatus 700 and/or a network entity such as a base node, a gNB, and/or the network equipment apparatus 800. In some embodiments, the first method may be performed by a processor executing program code, for example, a microcontroller, a microprocessor, a CPU, a GPU, an auxiliary processing unit, a FPGA, or the like.

In one embodiment, the first method includes determining a serving network of a user equipment ("UE") device, the serving network comprising a visited public land mobile network ("VPLMN") that is different from a home PLMN ("HPLMN") associated with the UE. In one embodiment, the first method includes selecting a network function within the serving network for provisioning an authentication and key management for applications ("AKMA") security context for an application function ("AF") based on a name for the serving network. In one embodiment, the first method includes sending the security context to the network function.

In one embodiment, the first method includes determining the serving network of the UE by detecting that the UE is in serving network. In one embodiment, the first method includes generating AKMA key information $K_{AKMA}$ and an AKMA key identifier A-KID. In one embodiment, the first method includes sending a registration request message to the selected network function based on the serving network name, the registration request message comprising the AKMA security context including the $K_{AKMA}$, the A-KID, and a Subscription Permanent Identifier ("SUPI") for the UE. In one embodiment, the first method includes receiving a registration response message from the selected network function for establishing a connection between the UE and the AF of the serving network.

In one embodiment, the selected network function comprises one of an access and mobility management function ("AMF") and a visited AKMA anchor function ("V-AAnF"). In one embodiment, the first method includes determining the serving network of the UE by at least one of querying an authentication server function ("AUSF") of the HPLMN for the serving network name, retrieving the serving network name during primary authentication with the UE, and receiving the serving network name from the AUSF together with the AKMA key information $K_{AKMA}$.

In one embodiment, the serving network name is received from the AUSF in response to a serving network name request, the serving network name request comprising a Subscription Permanent Identifier ("SUPI") for the UE.

In one embodiment, the first method includes sending a key provisioning request to the selected network function within the serving network, the key provisioning request comprising the AKMA security context including key information for the AKMA AF $K_{AF}$, an expiration time for the $K_{AF}$, a Subscription Permanent Identifier ("SUPI") for the UE, and an AKMA key identifier A-KID. In one embodiment, the first method includes receiving a key provisioning response message from the selected network function.

In one embodiment, the first method includes receiving a key request from an AF at a network function of the HPLMN associated with the UE, the key registration request for provisioning the AKMA security context for the AF for establishing a connection between the UE and the AF of the serving network. In one embodiment, the first method includes detecting that the serving network comprising the VPLMN that is different from the HPLMN associated with the UE is not enhanced with a network function within the serving network for provisioning the AKMA security context. In one embodiment, the first method includes sending a key response to the AF, the key response comprising an indication of NULL encryption and a Subscription Permanent Identifier ("SUPI") for the UE.

In one embodiment, the first method includes receiving an AKMA key information request for the AKMA AF $K_{AF}$ from the serving network. In one embodiment, the first method includes verifying the AKMA key information request. In one embodiment, in response to verifying the AKMA key information request, the first method includes generating the AKMA AF $K_{AF}$ and sending an AKMA key information response to the serving network comprising the AKMA AF $K_{AF}$ and an expiration time for the $K_{AF}$.

A second apparatus is disclosed for enabling roaming with authentication and key management for applications. The second apparatus may include a UE as described herein, for example, the remote unit 105, the UE and/or the user equipment apparatus 700 and/or a network entity such as a base node, a gNB, and/or the network equipment apparatus 800. In some embodiments, the second apparatus may include a processor executing program code, for example, a microcontroller, a microprocessor, a CPU, a GPU, an auxiliary processing unit, a FPGA, or the like.

In one embodiment, the second apparatus includes a transceiver that receives a key request at a network function of a serving network of a user equipment ("UE") device, the serving network comprising a visited public land mobile network ("VPLMN") that is different from a home PLMN ("HPLMN") associated with the UE, the key registration request for provisioning an authentication and key management for applications ("AKMA") security context for an application function ("AF") based on a name for the serving network for establishing a connection between the UE and the AF. In one embodiment, the transceiver sends a key response to a network function of the HPLMN.

In one embodiment, the second apparatus includes a processor that stores the security context information at the network function of the serving network. In one embodiment, the network function of the serving network comprises one of an access and mobility management function ("AMF") and a visited AKMA anchor function ("V-AAnF").

In one embodiment, the second apparatus includes a processor that detects that the key request is from an AAnF in the HPLMN based on an AKMA key identifier A-KID. In one embodiment, the transceiver sends the key request to the AAnF in the HPLMN and receives a key response from the AAnF of the HPLMN comprising key information for the AKMA AF $K_{AF}$ and an expiration time for the $K_{AF}$.

A second method is disclosed for enabling roaming with authentication and key management for applications. The second method may be performed by a UE as described herein, for example, the remote unit 105, the UE and/or the user equipment apparatus 700 and/or a network entity such as a base node, a gNB, and/or the network equipment apparatus 800. In some embodiments, the second method may be performed by a processor executing program code, for example, a microcontroller, a microprocessor, a CPU, a GPU, an auxiliary processing unit, a FPGA, or the like.

In one embodiment, the second method includes receiving a key request at a network function of a serving network of a user equipment ("UE") device, the serving network comprising a visited public land mobile network ("VPLMN") that is different from a home PLMN ("HPLMN") associated with the UE, the key registration request for provisioning an authentication and key management for applications ("AKMA") security context for an application function ("AF") based on a name for the serving network for establishing a connection between the UE and the AF. In one embodiment, the second method includes sending a key response to a network function of the HPLMN.

In one embodiment, the second method includes storing the security context information at the network function of the serving network. In one embodiment, the network function of the serving network comprises one of an access and mobility management function ("AMF") and a visited AKMA anchor function ("V-AAnF").

In one embodiment, the second method includes detecting that the key request is from an AAnF in the HPLMN based on an AKMA key identifier A-KID. In one embodiment, the second method includes sending the key request to the AAnF in the HPLMN and receives a key response from the AAnF of the HPLMN comprising key information for the AKMA AF $K_{AF}$ and an expiration time for the $K_{AF}$.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a network apparatus, comprising:
receiving a name of a serving network of a user equipment ("UE") from an authentication server function ("AUSF") in a home public land mobile network ("HPLMN"), the name for the serving network received as part of an authentication and key management for applications ("AKMA") key registration request;
determining, based on the name for the serving network, that the UE is roaming in a visited PLMN ("VPLMN") that is different from the HPLMN associated with the UE;
selecting a network function within the serving network for provisioning an AKMA security context for an application function ("AF") based on the received name for the serving network, wherein at least one AKMA capability and an address of the network function of the VPLMN are configured based on at least one service level agreement ("SLA") associated with the HPLMN; and
sending the AKMA security context to the network function.

2. The method of claim 1, further comprising:
generating AKMA key information $K_{AKMA}$ and an AKMA key identifier A-KID;
sending a registration request message to the selected network function based on the name of the serving network, the registration request message comprising the AKMA security context including the $K_{AKMA}$, the A-KID, and a Subscription Permanent Identifier ("SUPI") for the UE; and
receiving a registration response message from the selected network function for establishing a connection between the UE and the AF of the serving network.

3. The method of claim 2, wherein the selected network function comprises one of an access and mobility management function ("AMF") and a visited AKMA anchor function ("V-AAnF").

4. The method of claim 1, wherein determining the serving network of the UE comprises at least one of:
querying an authentication server function ("AUSF") of the HPLMN for the name of the serving network;
retrieving the name of the serving network during primary authentication with the UE; and
receiving the name of the serving network from the AUSF together with the AKMA key information $K_{AKMA}$.

5. The method of claim 4, wherein the name of the serving network is received from the AUSF in response to a serving network name request, the serving network name request comprising a Subscription Permanent Identifier ("SUPI") for the UE.

6. The method of claim 4, further comprising:
sending a key provisioning request to the selected network function within the serving network, the key provisioning request comprising the AKMA security context including key information for an AKMA AF $K_{AF}$, an expiration time for the AKMA AF $K_{AF}$, a Subscription Permanent Identifier ("SUPI") for the UE, and an AKMA key identifier A-KID; and
receiving a key provisioning response message from the selected network function.

7. The method of claim 4, further comprising:
receiving a key request from an AF at a network function of the HPLMN associated with the UE, the key registration request for provisioning the AKMA security context for the AF for establishing a connection between the UE and the AF of the serving network;
detecting that the serving network comprising the VPLMN that is different from the HPLMN associated with the UE is not enhanced with a network function within the serving network for provisioning the AKMA security context; and
sending a key response to the AF, the key response comprising an indication of NULL encryption and a Subscription Permanent Identifier ("SUPI") for the UE.

8. The method of claim 1, further comprising:
receiving an AKMA key information request for the AKMA AF $K_{AF}$ from the serving network;
verifying the AKMA key information request; and
in response to verifying the AKMA key information request, generating the AKMA
AF $K_{AF}$ and sending an AKMA key information response to the serving network comprising the AKMA AF $K_{AF}$ and an expiration time for the AKMA AF $K_{AF}$.

9. A network apparatus, comprising:
a processor; and
a memory coupled to the processor, the memory comprising instructions that are executable by the processor to cause the apparatus to:
receive a name of a serving network of a user equipment ("UE") from an authentication server function ("AUSF") in a home public land mobile network ("HPLMN"), the name for the serving network received as part of an authentication and key management for applications ("AKMA") key registration request;
determine, based on the name for the serving network, that the UE is roaming in a visited PLMN ("VPLMN") that is different from the HPLMN associated with the UE;
select a network function within the serving network for provisioning an AKMA security context for an application function ("AF") based on the received name for the serving network, wherein at least one AKMA capability and an address of the network function of the VPLMN are configured based on at least one service level agreement ("SLA") associated with the HPLMN; and
send the AKMA security context to the network function.

10. The apparatus of claim 9, wherein the instructions are executable by the processor to cause the apparatus to:
generate AKMA key information KAKMA and an AKMA key identifier A-KID;
send a registration request message to the selected network function based on the name of the serving network, the registration request message comprising the AKMA security context including the KAKMA, the A-KID, and a Subscription Permanent Identifier ("SUPI") for the UE; and
receive a registration response message from the selected network function for establishing a connection between the UE and the AF of the serving network.

11. The apparatus of claim 10, wherein the selected network function comprises one of an access and mobility management function ("AMF") and a visited AKMA anchor function ("V-AAnF").

12. The apparatus of claim 9, wherein the instructions are executable by the processor to cause the apparatus to determine the serving network of the UE by at least one of:
querying an authentication server function ("AUSF") of the HPLMN for the name of the serving network;
retrieving the name of the serving network during primary authentication with the UE;
receiving the name of the serving network from the AUSF together with AKMA key information $K_{AKMA}$.

13. The apparatus of claim 12, wherein the name of the serving network is received from the AUSF in response to a serving network name request, the serving network name request comprising a Subscription Permanent Identifier ("SUPI") for the UE.

14. The apparatus of claim 13, wherein the instructions are executable by the processor to cause the apparatus to:
receive a key request from an AF at a network function of the HPLMN associated with the UE, the key registration request for provisioning the AKMA security context for the AF for establishing a connection between the UE and the AF of the serving network;
detect that the serving network comprising the VPLMN that is different from the HPLMN associated with the UE is not enhanced with a network function within the serving network for provisioning the AKMA security context; and
send a key response to the AF, the key response comprising an indication of NULL encryption and a Subscription Permanent Identifier ("SUPI") for the UE.

15. A network apparatus, comprising:
a processor; and
a memory coupled to the processor, the memory comprising instructions that are executable by the processor to cause the apparatus to:
receive a key request at a network function of a serving network of a user equipment ("UE"), the serving network comprising a visited public land mobile network ("VPLMN") that is different from a home PLMN ("HPLMN") associated with the UE, the key registration request for provisioning an authentication and key management for applications ("AKMA") security context for an application function ("AF") based on a name of the serving network for establishing a connection between the UE and the AF;

store the AKMA security context for requests associated with legal interception at a network function of the VPLMN, wherein at least one AKMA capability and an address of the network function of the VPLMN are configured based on at least one service level agreement ("SLA") associated with the HPLMN; and send a key response to a network function of the HPLMN.

16. The apparatus of claim 15, wherein the network function of the serving network comprises one of an access and mobility management function ("AMF") and a visited AKMA anchor function ("V-AAnF").

17. The apparatus of claim 15, wherein the instructions are executable by the processor to cause the apparatus to:
    detect that the key request is from an AKMA anchor function (AAnF) in the HPLMN based on an AKMA key identifier A-KID;
    send the key request to the AAnF in the HPLMN; and
    receive a key response from the AAnF in the HPLMN comprising key information for an AKMA AF $K_{AF}$ and an expiration time for the AKMA AF $K_{AF}$.

* * * * *